United States Patent
Bontu et al.

(10) Patent No.: US 12,273,284 B2
(45) Date of Patent: Apr. 8, 2025

(54) NETWORK SLICING IN CELLULAR SYSTEMS

(71) Applicant: Telefonaktiebolaget LM Ericsson (publ), Stockholm (SE)

(72) Inventors: Chandra Bontu, Nepean (CA); Christian Skärby, Stockholm (SE); Ali Yaver, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 419 days.

(21) Appl. No.: 17/786,826

(22) PCT Filed: Dec. 16, 2020

(86) PCT No.: PCT/IB2020/062064
§ 371 (c)(1),
(2) Date: Jun. 17, 2022

(87) PCT Pub. No.: WO2021/130615
PCT Pub. Date: Jul. 1, 2021

(65) Prior Publication Data
US 2023/0353294 A1 Nov. 2, 2023

Related U.S. Application Data

(60) Provisional application No. 62/953,746, filed on Dec. 26, 2019.

(51) Int. Cl.
*H04L 5/00* (2006.01)
*H04L 47/6295* (2022.01)
*H04W 16/02* (2009.01)
*H04W 72/12* (2023.01)
*H04W 72/56* (2023.01)

(52) U.S. Cl.
CPC ........... *H04L 5/0023* (2013.01); *H04W 72/12* (2013.01); *H04W 72/56* (2023.01)

(58) Field of Classification Search
CPC . H04L 5/0023; H04L 47/6295; H04L 5/0026; H04L 5/0064; H04W 72/12; H04W 72/56; H04W 16/02
See application file for complete search history.

(56) References Cited

U.S. PATENT DOCUMENTS

| 11,616,613 | B2 * | 3/2023 | Khoshnevisan | .. H04W 72/0453 370/329 |
| 2015/0188680 | A1 * | 7/2015 | Li | ...................... H04W 28/0278 370/329 |

(Continued)

FOREIGN PATENT DOCUMENTS

WO     2018/075828 A1     4/2018

OTHER PUBLICATIONS

International Search Report and Written Opinion dated Mar. 16, 2021 issued in PCT Application PCT/IB2020/062064, consisting of 14 pages.

(Continued)

*Primary Examiner* — Harry H Kim
(74) *Attorney, Agent, or Firm* — Sonoda & Kobayashi Intellectual Property Law; Sarvajit S. Patil

(57) ABSTRACT

A method, system and apparatus for network slicing in cellular systems are disclosed. According to one aspect, a network node is provided. The network node includes processing circuitry configured to determine virtual resources at least in part by logically slicing a plurality of physical resources across a spatial domain, and assign the virtual resources to a first radio bearer associated with a first wireless device.

21 Claims, 12 Drawing Sheets

(56) References Cited

U.S. PATENT DOCUMENTS

| | | | |
|---|---|---|---|
| 2016/0242193 A1* | 8/2016 | Hong | H04B 7/2612 |
| 2019/0174522 A1* | 6/2019 | Xiao | H04W 28/18 |
| 2019/0356450 A1* | 11/2019 | He | H04W 72/20 |
| 2020/0022215 A1* | 1/2020 | Takahashi | H04W 76/19 |
| 2020/0344640 A1* | 10/2020 | Wu | H04W 72/21 |
| 2021/0266954 A1* | 8/2021 | Xu | H04L 1/1896 |
| 2022/0394601 A1* | 12/2022 | Zhang | H04L 1/08 |

OTHER PUBLICATIONS

Bana Alexandru-Sabin et al., Massive MIMO for Internet of Things (IoT) Connectivity, Sep. 21, 2019, Physical Communication, Elsevier, Amsterdam, consisting of 17 pages.

Qimei Chen et al., Spatial Multiplexing Based NR-U and WiFi Coexistence in Unlicensed Spectrum, IEEE 90th Vehicular Technology Conference, Sep. 22, 2019, consisting of 5 pages.

Soliman et al., QoS-Aware Frequency-Space Network Slicing and Admission Control for Virtual Wireless Networks, IEEE Global Communications Conference (GLOBECOM) III, Dec. 4, 2016, consisting of 6 pages.

3GPP TS 38.214 V15.7.0 (Sep. 2019) 3rd Generation Partnership Project; Technical Specification Group Radio Access Network; NR; Physical Layer Procedures for Data (Release 15), consisting of 106 pages.

3GPP TS 36.213 V15.7.0 (Sep. 2019) 3rd Generation Partnership Project; Technical Specification Group Radio Access Network; Evolved Universal Terrestrial Radio Access (E-UTRA); Physical Layer Procedures (Release 15), consisting of 551 pages.

* cited by examiner

NETWORK SLICING IN CELLULAR SYSTEMS

CROSS-REFERENCE TO RELATED APPLICATIONS

This application is a Submission Under 35 U.S.C. § 371 for U.S. National Stage Patent Application of International Application No.: PCT/IB2020/062064, filed Dec. 16, 2020 entitled "NETWORK SLICING IN CELLULAR SYSTEMS," which claims priority to U. S. Provisional Application No.: 62/953746, filed Dec. 26, 2019, entitled "NETWORK SLICING IN CELLULAR SYSTEMS," the entireties of both of which are incorporated herein by reference.

TECHNICAL FIELD

The present disclosure relates to wireless communications, and in particular, to network slicing in cellular systems.

BACKGROUND

In many cellular networks, it may be advantageous for the service providers to slice the network end-to-end to guarantee resources for different types of services. In other applications, a network may be sliced end-to-end to enable network sharing between multiple service providers. With the advent of advanced antenna systems (AAS) and massive multiple input multiple output (MIMO) and full-dimension MIMO, a network may reuse radio resources spatially among the active users in a network.

In some existing solutions, the network resources are sliced based on the physical resource split among the services. However, when the resources are reused among multiple radio bearers, i.e., when radio resources are co-scheduled among data flows/radio bearers that belong to different users or the same user by exploiting channel decorrelation properties, the available radio resources are opportunistically increased. In this case, slicing by physical radio resources may not provide the desired outcome.

SUMMARY

Some embodiments advantageously provide methods and network nodes for network slicing in cellular systems.

Some embodiments include methods to slice the network resources when the radio resources in the network are reused spatially. Some proposed methods are applicable when multiple radio bearers (or data flows) are co-scheduled on a radio resource. According to some embodiments, the physical radio resources are converted to "virtual radio resources", which are allocated to different users and/or services. If a radio resource is simultaneously allocated more than one user, the radio resource may be counted as multiple virtual resources, distributed among multiple users.

For co-scheduling of multiple radio bearers on a physical radio resource, for example in multi user (MU)-MIMO, the number of available resources is not fixed to the bandwidth, but also depends on the spatial properties of the channel. In one example, if two users are spatially multiplexed on N physical resource block (PRBs), virtual resources are employed to count each user getting N PRBs out of a resource pool of 2N PRBs. As shown in FIG. 1, the proposed method consists of the following steps at every transmission time interval (TTI):

co-scheduling radio bearers on a set of available physical resource blocks;
computing the virtual resource blocks that are allocated to each service type;
computing a resource utilization margin for each service type; and
adjusting service priorities of each of the services for next TTI based on the computed margin.

According to one aspect of the disclosure, a network node is provided. The network node includes processing circuitry configured to determine virtual resources at least in part by logically slicing a plurality of physical resources across a spatial domain and assign the virtual resources to a first radio bearer associated with a first wireless device.

According to one or more embodiments of this aspect, the logical slicing of the plurality of physical resources across the spatial domain is performed by service type. According to one or more embodiments of this aspect, at least one of the plurality of physical resources is reused among a plurality of radio bearers including the first radio bearer. According to one or more embodiments of this aspect, the determined virtual resources correspond to a logical slice of the plurality of physical resources.

According to one or more embodiments of this aspect, the processing circuitry is further configured to co-schedule a plurality of radio bearers including the first radio bearer on at least one logical slice of the plurality of physical resources and compute a number of virtual resources that are assigned to each service type of the plurality of radio bearers. The processing circuitry is further configured to compute a resource margin for each service type of the plurality of radio bearers and adjust a service priority for at least one of the plurality of radio bearers for a next transmission time interval, TTI, based on the resource margin. According to one or more embodiments of this aspect, the service priority corresponds to service-type priority level that is based on a virtual resource share in a previous TTI. According to one or more embodiments of this aspect, co-scheduling the plurality of radio bearers includes prioritizing the plurality of radio bearers per service type in a plurality of service queues, and prioritizing the plurality of radio bearers for allocation in a TTI based at least on each service type associated with each of the plurality of radio bearers. The assigning of the virtual resources to the first radio bearer is based at least on the prioritizing of the plurality of radio bearers for allocation.

According to one or more embodiments of this aspect, co-scheduling the plurality of radio bearers includes prioritizing the plurality of radio bearers in a plurality of service queues based on service type and at least one priority within a respective service type and prioritizing the plurality of radio bearers for allocation in a TTI based at least on each service type and the at least one priority within the respective service type. The assigning of the virtual resources to the first radio bearer is based at least on the prioritizing of the plurality of radio bearers for allocation. According to one or more embodiments of this aspect, the plurality of physical resources corresponds to N physical resources that are spatially multiplexed to correspond to a pool of M*N virtual resources, where M corresponds to a number of wireless devices, each wireless device including the first wireless device being assigned N virtual resources.

According to one or more embodiments of this aspect, the processing circuitry is further configured to assign a plurality of wireless device including the first wireless device respective virtual resources for Multi User-Multiple Input Multiple Output, MU-MIMO, communication. According to one or more embodiments of this aspect, the virtual resources assigned to the first radio bearer correspond to a sum of weights of the plurality of physical resources where each weight corresponds to a transmit power for transmitting information to the wireless device on at least one physical resource divided by a total available transmit power for physical resources allowed scheduling to wireless devices in a TTI.

According to another aspect of the disclosure, a method performed by a network node is provided. Virtual resources are determined at least in part by logically slicing a plurality of physical resources across a spatial domain. The virtual resources are assigned to a first radio bearer associated with a first wireless device.

According to one or more embodiments of this aspect, the logical slicing of the plurality of physical resources across the spatial domain is performed by service type. According to one or more embodiments of this aspect, at least one of the plurality of physical resources is reused among a plurality of radio bearers including the first radio bearer. According to one or more embodiments of this aspect, the determined virtual resources correspond to a logical slice of the plurality of physical resources.

According to one or more embodiments of this aspect, a plurality of radio bearers including the first radio bearer are co-scheduled on at least one logical slice of the plurality of physical resources. A number of virtual resources that are assigned to each service type of the plurality of radio bearers is computed. A resource margin for each service type of the plurality of radio bearers is computed. A service priority for at least one of the plurality of radio bearers is adjusted for a next transmission time interval, TTI, based on the resource margin. According to one or more embodiments of this aspect, the service priority corresponds to service-type priority level that is based on a virtual resource share in a previous TTI. According to one or more embodiments of this aspect, co-scheduling the plurality of radio bearers includes prioritizing the plurality of radio bearers per service type in a plurality of service queues and prioritizing the plurality of radio bearers for allocation in a TTI based at least on each service type associated with each of the plurality of radio bearers. The assigning of the virtual resources to the first radio bearer is based at least on the prioritizing of the plurality of radio bearers for allocation.

According to one or more embodiments of this aspect, co-scheduling the plurality of radio bearers includes prioritizing the plurality of radio bearers in a plurality of service queues based on service type and at least one priority within a respective service type and prioritizing the plurality of radio bearers for allocation in a TTI based at least on each service type and the at least one priority within the respective service type. The assigning of the virtual resources to the first radio bearer being is at least on the prioritizing of the plurality of radio bearers for allocation. According to one or more embodiments of this aspect, the plurality of physical resources corresponds to N physical resources that are spatially multiplexed to correspond to a pool of M*N virtual resources, where M corresponds to a number of wireless devices and each wireless device including the first wireless device is assigned N virtual resources. According to one or more embodiments of this aspect, a plurality of wireless device including the first wireless device are assigned respective virtual resources for Multi User-Multiple Input Multiple Output, MU-MIMO, communication. According to one or more embodiments of this aspect, the virtual resources assigned to the first radio bearer correspond to a sum of weights of the plurality of physical resources where each weight corresponds to a transmit power for transmitting information to the wireless device on at least one physical resource divided by a total available transmit power for physical resources allowed scheduling to wireless devices in a TTI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 illustrates a hierarchy of priority levels to guarantee resource slicing and quality of service with a limit on over-use;

DETAILED DESCRIPTION

Figure 1:
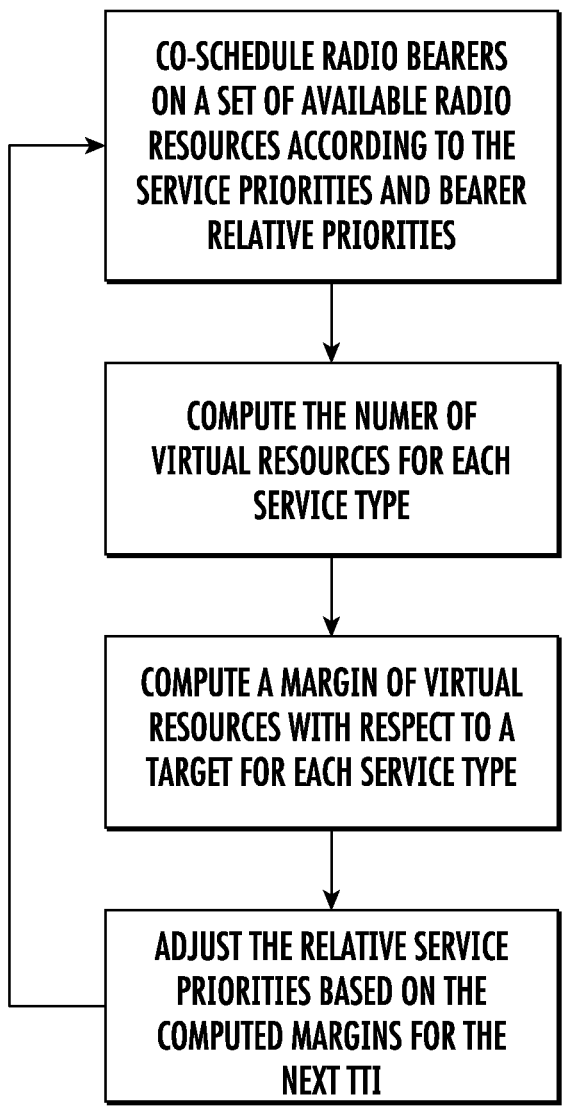
FIG. 1 is a flowchart of an example process according to principles set forth herein.

Before describing in detail example embodiments, it is noted that the embodiments reside primarily in combinations of apparatus components and processing steps related to network slicing in cellular systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, the Long Term Evolution wireless system and/or New Radio (NR), as developed and being developed according to technical standards promulgated by the Third Generation Partnership Project (3GPP) may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Transmitting in the downlink may pertain to transmission from the network or network node to the wireless device. Transmitting in the uplink may pertain to transmission from the wireless device to the network or network node. Transmitting in the sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide network slicing in cellular systems. With AAS enabled, system capacity can be increased by reusing resources in spatial domain. Some embodiments provide for slicing the available resources, when the resources are distributed over time, frequency and spatial domain. The "virtual resource" as proposed in this proposal gives generic frame work for resource-slicing for massive MIMO systems.

With AAS enabled, system capacity can be increased by reusing resources in spatial domain. Some embodiments provide for slicing the available resources, when the resources are distributed over time, frequency and spatial domains. The "virtual resource" provides a framework for resource-slicing for massive MIMO systems.

Figure 2:
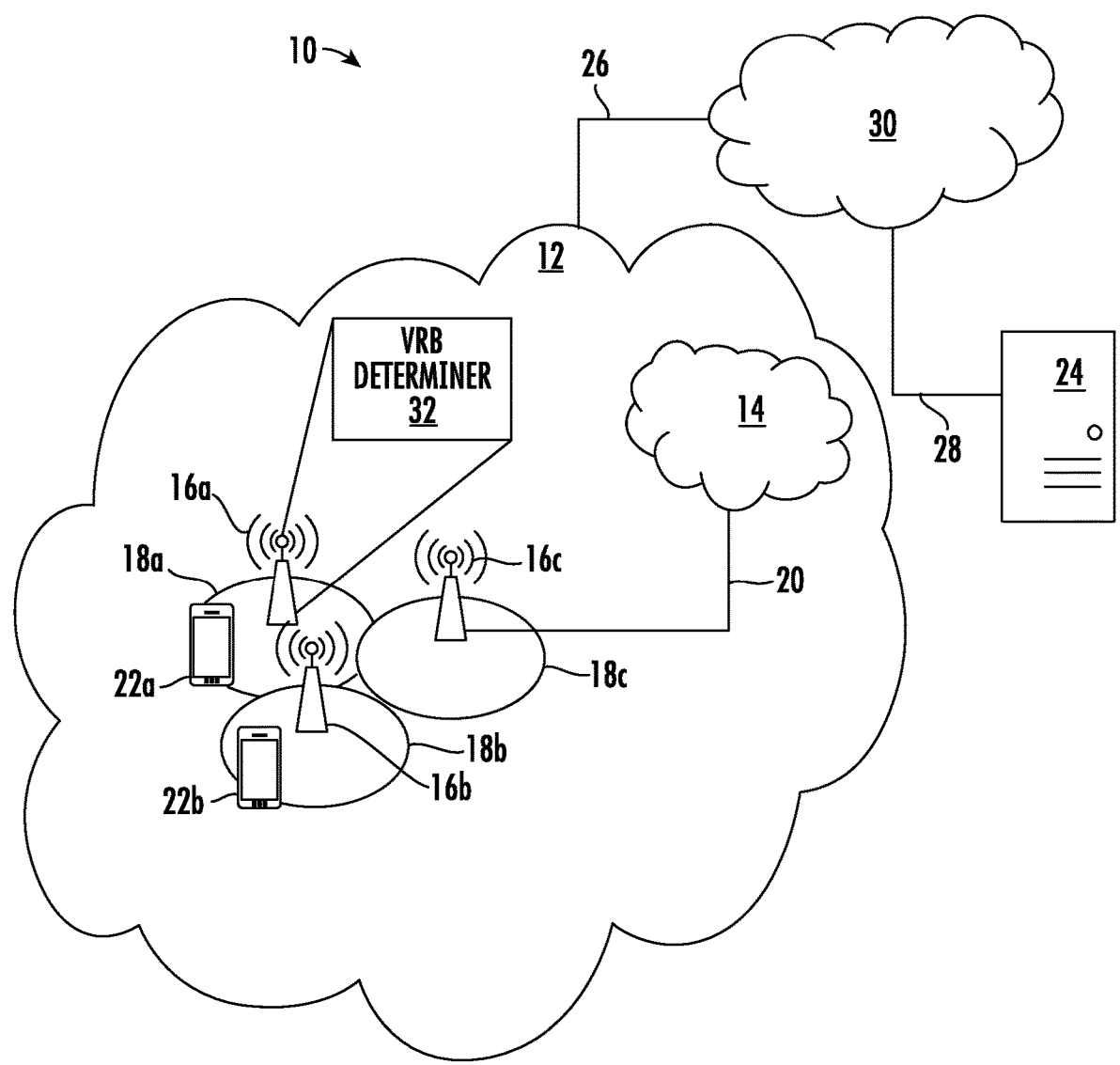
FIG. 2 is a schematic diagram of an example network architecture illustrating a communication system connected via an intermediate network to a host computer according to the principles in the present disclosure.

Returning again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a virtual resource block (VRB) determiner 32 which is configured to determine virtual resource blocks, VRBs, allocated to each of at least one service type.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include virtual resource block (VRB) determiner 32 which is configured to determine virtual resource blocks, VRBs, allocated to each of at least one service type.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 3:
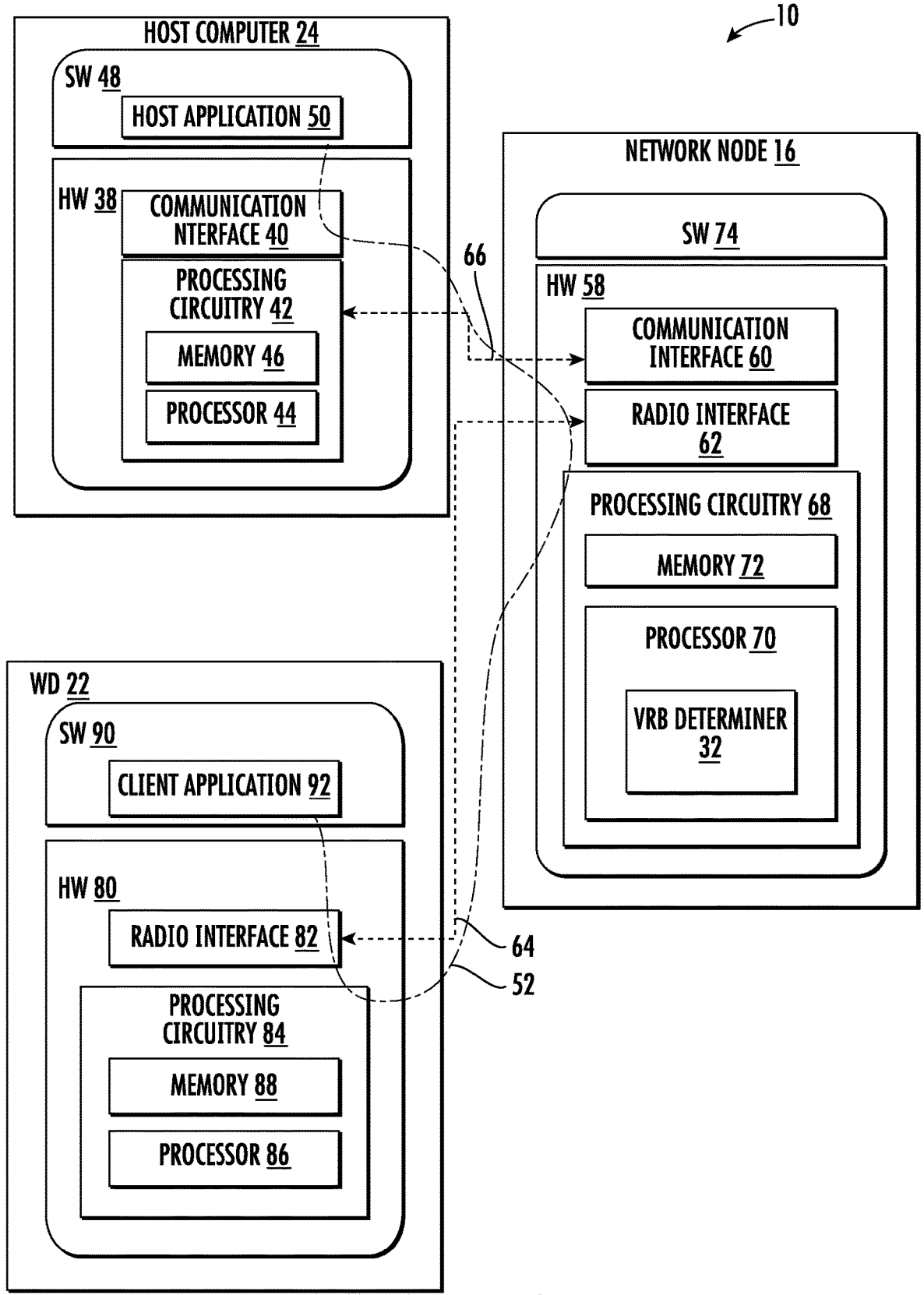
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both.

While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as VRB determiner 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
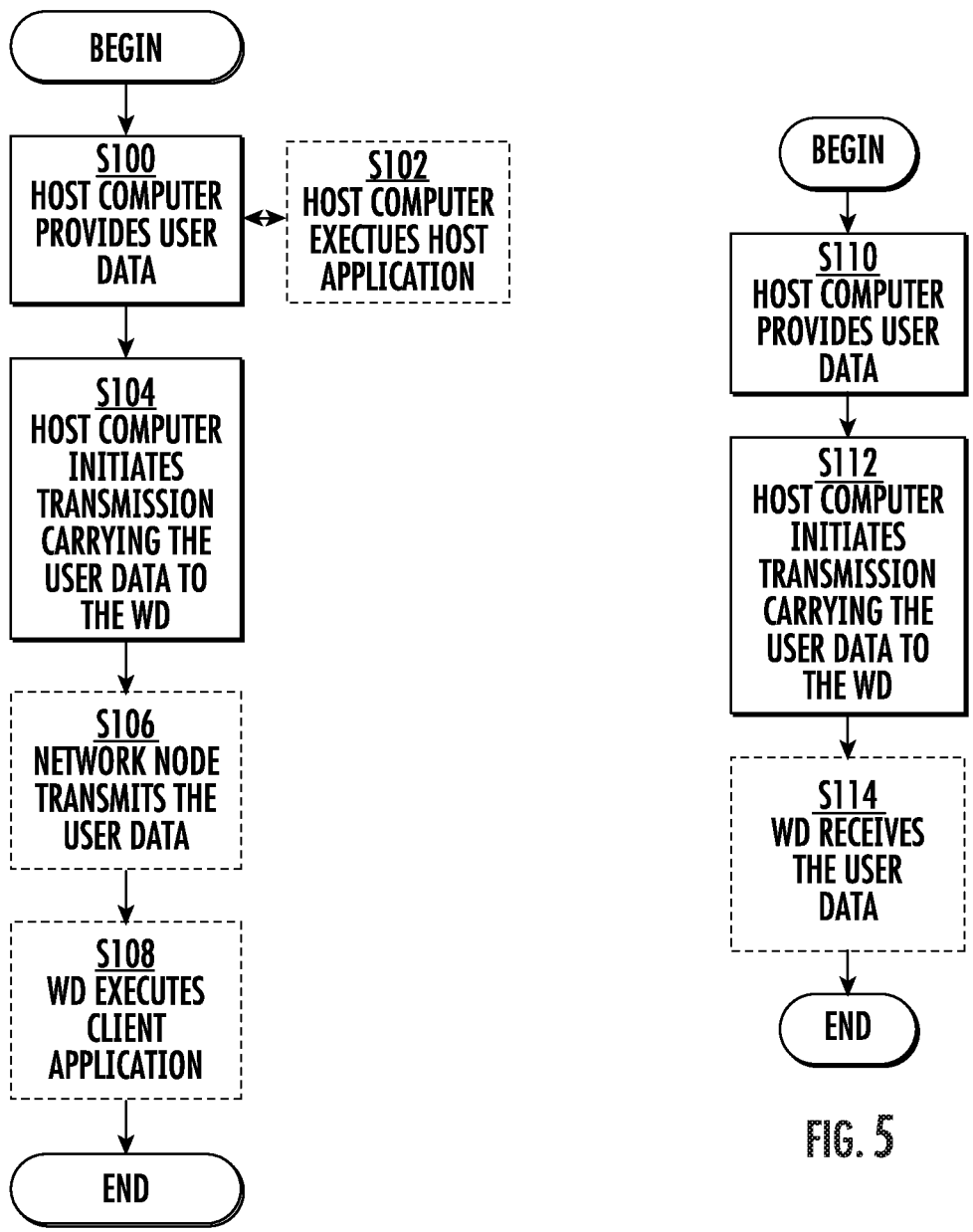
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
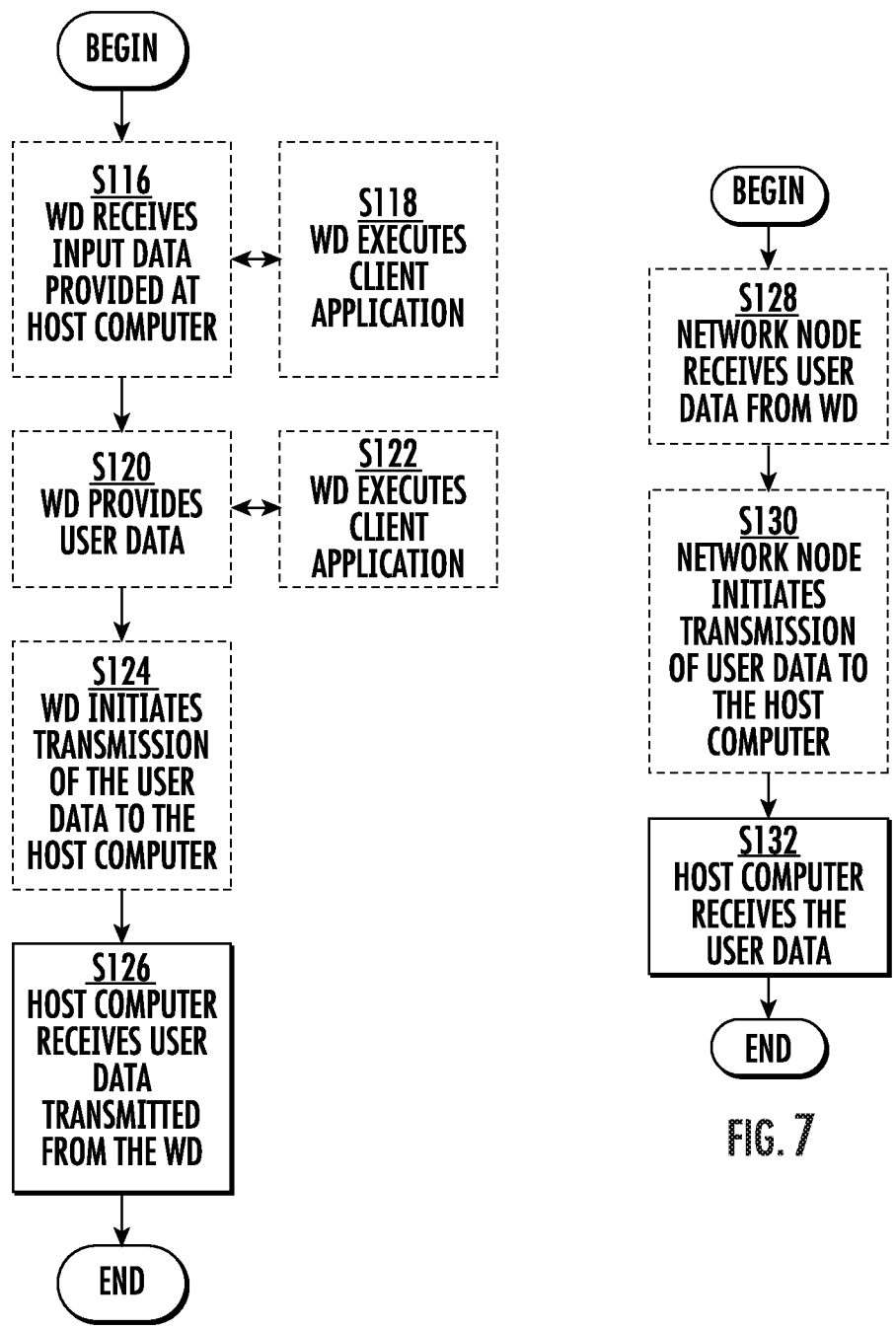
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
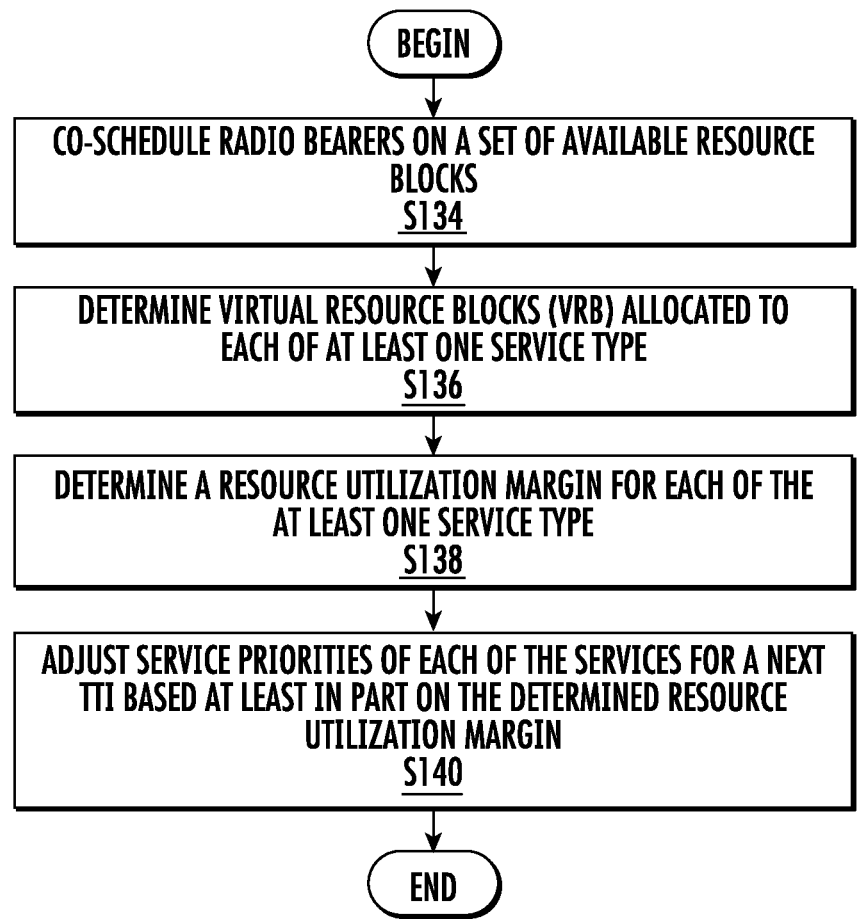
FIG. 8 is a flowchart of an example process in a network node for network slicing in cellular systems.

FIG. 8 is a flowchart of an example process in a network node 16 for network slicing in cellular systems. One or more blocks described herein may be performed by one or more elements of network node 16 such as by one or more of processing circuitry 68 (including the VRB determiner 32), processor 70, radio interface 62 and/or communication interface 60. Network node 16 such as via processing circuitry 68 and/or processor 70 and/or radio interface 62 and/or communication interface 60 is configured to co-schedule radio bearers on a set of available resource blocks (Block S134). The process also includes determining virtual resource blocks, VRBs, allocated to each of at least one service type (Block S136). The process further includes determining a resource utilization margin for each of the at least one service type (Block S138). The process also includes adjusting service priorities of each of the services for a next TTI based at least in part on the determined resource utilization margin (Block S140).

Figure 9:
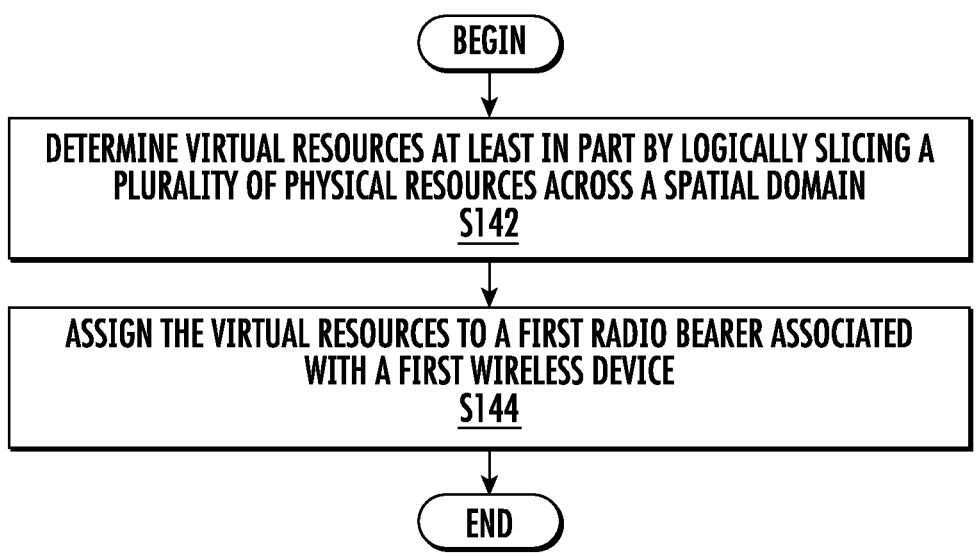
FIG. 9 is a flowchart of another example process in a network node for network slicing in cellular systems.

FIG. 9 is a flowchart of an example process in a network node 16 for network slicing in cellular systems. One or more blocks described herein may be performed by one or more elements of network node 16 such as by one or more of processing circuitry 68 (including the VRB determiner 32), processor 70, radio interface 62 and/or communication interface 60. Network node 16 such as via processing circuitry 68 and/or processor 70 and/or radio interface 62 and/or communication interface 60 is configured to determine (Block S142) virtual resources at least in part by logically slicing a plurality of physical resources across a spatial domain, as described herein. Network node 16 such as via processing circuitry 68 and/or processor 70 and/or radio interface 62 and/or communication interface 60 is configured to assign (Block S142) the virtual resources to a first radio bearer associated with a first wireless device 22, as described herein.

According to one or more embodiments, the logical slicing of the plurality of physical resources across the spatial domain is performed by service type. According to one or more embodiments, at least one of the plurality of physical resources is reused among a plurality of radio bearers including the first radio bearer. According to one or more embodiments, the determined virtual resources correspond to a logical slice of the plurality of physical resources.

According to one or more embodiments, the processing circuitry 68 is further configured to co-schedule a plurality of radio bearers including the first radio bearer on at least one logical slice of the plurality of physical resources, and compute a number of virtual resources that are assigned to each service type of the plurality of radio bearers. The processing circuitry 68 is further configured to compute a resource margin for each service type of the plurality of radio bearers, and adjust a service priority for at least one of the plurality of radio bearers for a next transmission time interval, TTI, based on the resource margin. According to one or more embodiments, the service priority corresponds to service-type priority level that is based on a virtual resource share in a previous TTI. According to one or more embodiments, co-scheduling the plurality of radio bearers includes prioritizing the plurality of radio bearers per service type in a plurality of service queues, and prioritizing the plurality of radio bearers for allocation in a TTI based at least on each service type associated with each of the plurality of radio bearers. The assigning of the virtual resources to the first radio bearer is based at least on the prioritizing of the plurality of radio bearers for allocation.

According to one or more embodiments, co-scheduling the plurality of radio bearers includes prioritizing the plurality of radio bearers in a plurality of service queues based on service type and at least one priority within a respective service type, and prioritizing the plurality of radio bearers for allocation in a TTI based at least on each service type and the at least one priority within the respective service type. The assigning of the virtual resources to the first radio bearer is based at least on the prioritizing of the plurality of radio bearers for allocation. According to one or more embodiments, the plurality of physical resources corresponds to N physical resources that are spatially multiplexed to correspond to a pool of M*N virtual resources, where M corresponds to a number of wireless devices 22 and each wireless device 22 includes the first wireless device 22 being assigned N virtual resources. According to one or more embodiments, the processing circuitry 68 is further configured to assign a plurality of wireless device 22 including the first device respective virtual resources for Multi User-Multiple Input Multiple Output, MU-MIMO, communication. According to one or more embodiments, the virtual resources assigned to the first radio bearer correspond to a sum of weights of the plurality of physical resources where each weight corresponds to a transmit power for transmitting information to the wireless device on at least one physical resource divided by a total available transmit power for physical resources allowed scheduling to wireless devices in a TTI.

Having described the general process flow of arrangements of the disclosure and having provided examples of hardware and software arrangements for implementing the processes and functions of the disclosure, the sections below provide details and examples of arrangements for network slicing in cellular systems such as to allow for determining, assigning and/or using of virtual resources by logically slicing physical resources in the spatial domain/spectrum, thereby, for example, allowing physical resources to be logically sliced according to a characteristic such as service type.

Typically, resources may be allocated, for example via the processing circuitry 68, to a radio bearer based on a combination of the radio bearer's service-type priority ($p_s$) and the radio bearer's relative priority within each service type ($p_L$). Service-type priority level, $p_s$, may be dynamically controlled, for example via the processing circuitry 68, to meet a target resource slice for each service, whereas, radio bearer's priority level within S, a service, $p_L$ may guarantee the quality of service (QoS) of the radio bearer.

Figure 10:
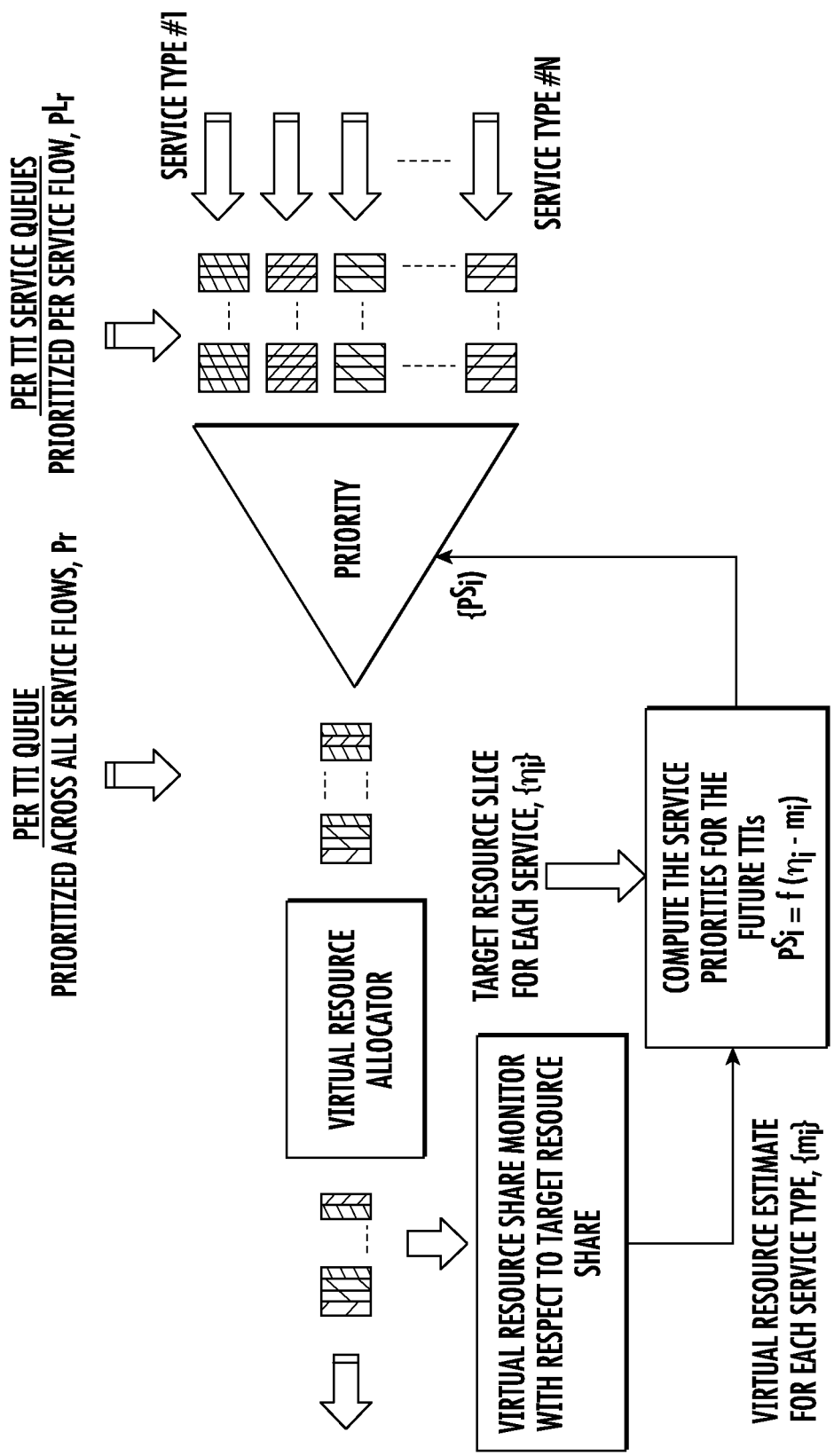
FIG. 10 illustrates a hierarchy of priority levels to guarantee resource slicing and quality of service.
Figure 7:
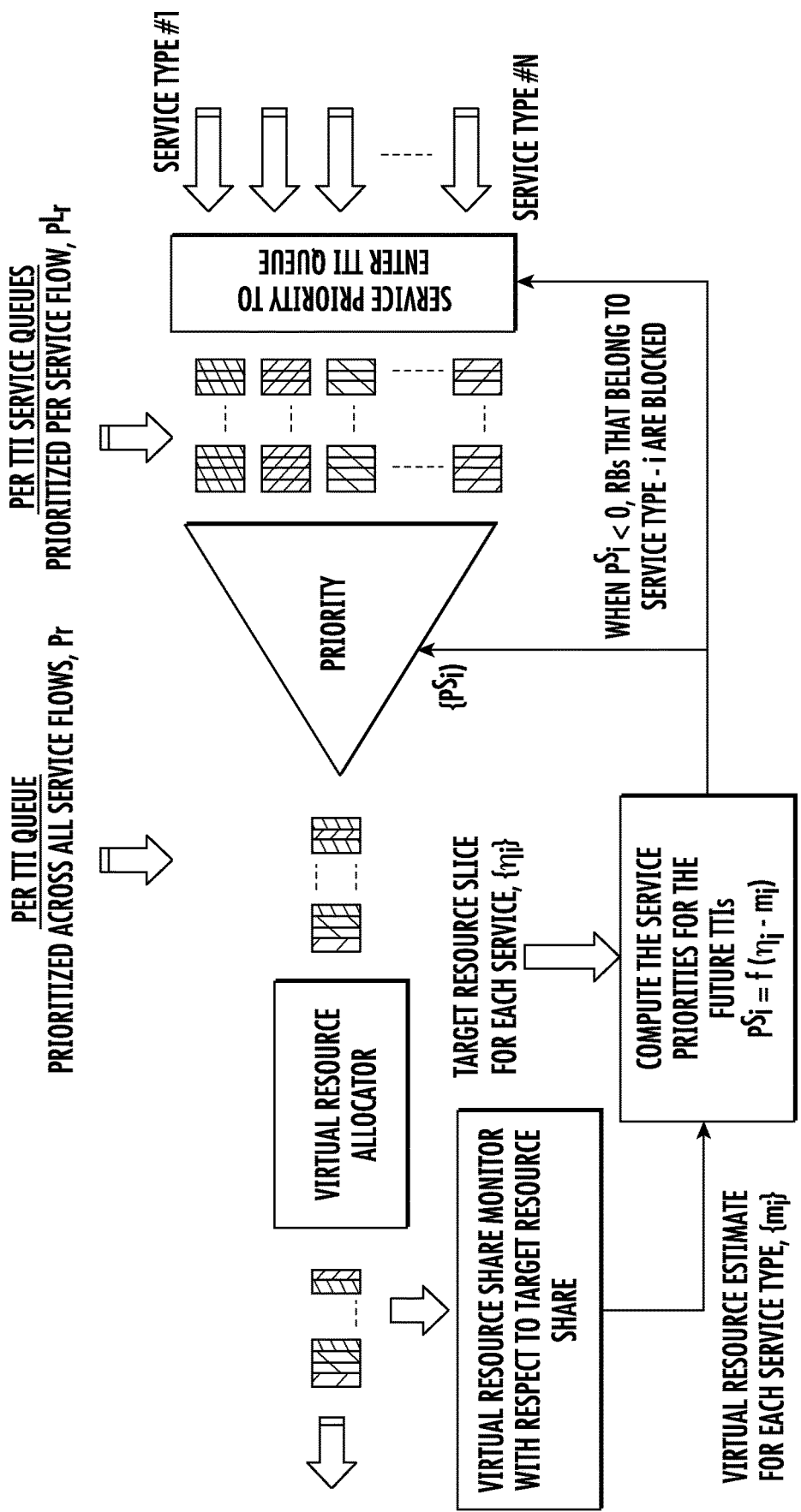

As illustrated in FIG. 10, according to one embodiment, service-type priority, $p_s$, for a current TTI is derived by the processing circuitry 68 (for example) by monitoring virtual resource sharing for each service type determined in a previous TTI. The co-scheduling of radio resources may depend on the number of available resources not fixed to the bandwidth, and may also depend on the spatial properties of the channel. In one example, if two wireless devices 22 are spatially multiplexed on N physical radio resources, virtual resources may be based on a count of wireless devices 22 getting N physical radio resources out of a resource pool of 2N radio resources. In a more general example, the plurality of physical resources corresponds to N physical resources that are spatially multiplexed to correspond to a pool of M*N virtual resources where M corresponds to a number of wireless devices 22 and each wireless device 22 is assigned N virtual resources.

For each radio bearer of a service type, data is received via radio interface 62 and waits to be served in the order of priority, $p_L$(denoted as $p_r^L$ in FIG. 10, representing the rth radio-bearer). A measured served level priority, $p_s$ (denoted as $p_i^S$ FIG. 10, representing the ith service type), in a previous TTI helps in forming one queue to be served in the current TTI and selecting radio bearers from individual service queues. Service priority may be determined, via the processing circuitry 68, based at least in part on the resource usage of the radio bearers for a given service up until a previous TTI. If the resource usage exceeds the limit, the radio bearers belonging to that service may be deprioritized via the processing circuitry 68 in future TTIs.

One or more embodiments described herein dynamically uses the available resources according to the radio bearer priority, thus maximizing the resource utilization. For example, though resource usage for a service may exceed the resource-slice limit, the service can continue to use available virtual resources, when there is no/less demand for resources from other services.

The priority of a radio bearer, p, in a TTI may be determined via the processing circuitry 68, based on the combination of the estimated $p_s$ and $p_L$ every TTI. $P_s$ is estimated by the processing circuitry 68 every TTI, when $m_i$ and $\eta_i$ are the estimates of virtual resource sharing and resource slice for service type –i, |

$$u_i = \eta_i - m_i$$

$$p_s = f(u_i)$$

where f(x) is a monotonically increasing function in x, i.e., when the service virtual resource share is lower than the target share, the priority of the service is increased in a future TTI. For example, $p_s$ can be estimated as follows:

$$p_s = \tan(\tilde{u}_i \alpha \pi)$$

where $\tilde{u}_i$ is normalized value of $u_i$ such that $0.5 < \tilde{u}_i < 0.5$ and $0.5 < \alpha < 1$.

$$\hat{u}_i = \begin{cases} \beta * \text{sign}(u_i) & \text{for } |u_i| > \beta \\ u_i & \text{otherwise} \end{cases}$$

$$\tilde{u}_i = \frac{\hat{u}_i}{2\beta}$$

$$p_S = \tan(\alpha \pi \tilde{u}_i)$$

where $\beta$ represents a maximum deviation of resource utilization.

In another example, $p_s$ can be represented by quantized levels as follows:

$$p_s = \zeta + \lfloor \gamma \{\tan(\alpha \pi \tilde{u}_i)\} \rfloor$$

where $\gamma$ determines the number of quantization levels to represent the relative priority between the services based on the utilization of resources with respect to the target share. $\zeta$ is set such that the when a service exceeds the target share by a predetermined level, the service is not allowed to contend for resources in the next TTI.

$$0 \leq \zeta < \lfloor -\gamma \tan(\alpha \pi) \rfloor$$

FIG. 11 shows an example scenario when a cap on resource over-use is employed. Typically, in a orthogonal frequency division multiplexing (OFDM) system, the available bandwidth is subdivided into number of radio resources, i.e., the smallest denomination of bandwidth unit that can be allocated to a user. A radio resource is typically defined as a set of subcarriers and OFDM symbols.

In some embodiments, the radio resource slice for a radio bearer is obtained via the processing circuitry 68 by a sum of the weights corresponding to physical radio resources allocated to the radio bearer.

When a set of physical radio resources, $\Omega_i$, are allotted to WD-i, for example, WD 22a, the resource slice, $\theta_i$, is determined as follows:

$$\theta_i = \sum_{k \in \Omega_i} w_i$$

Downlink

The weight corresponding to an allocated downlink (DL) radio resource (or a virtual resource) may be computed, for example by the processing circuitry 68, as a fraction of available transmit power in a TTI used to transmit the information on the radio resource, i.e., $w_i = P_k(i)/T$, $P_k(i)$ is the transmit power for transmitting information to WD-i on physical radio resource k. T is the total available transmit power for the resources allowed scheduling users in a given TTI. The available transmit power T is distributed across all the time-frequency resources in the TTI. The resource slice for serviceType-l, $S_l$ is computed as follows.

$$S_l = \sum_{j \in serviceType-l} \theta_j$$

Figure 12:
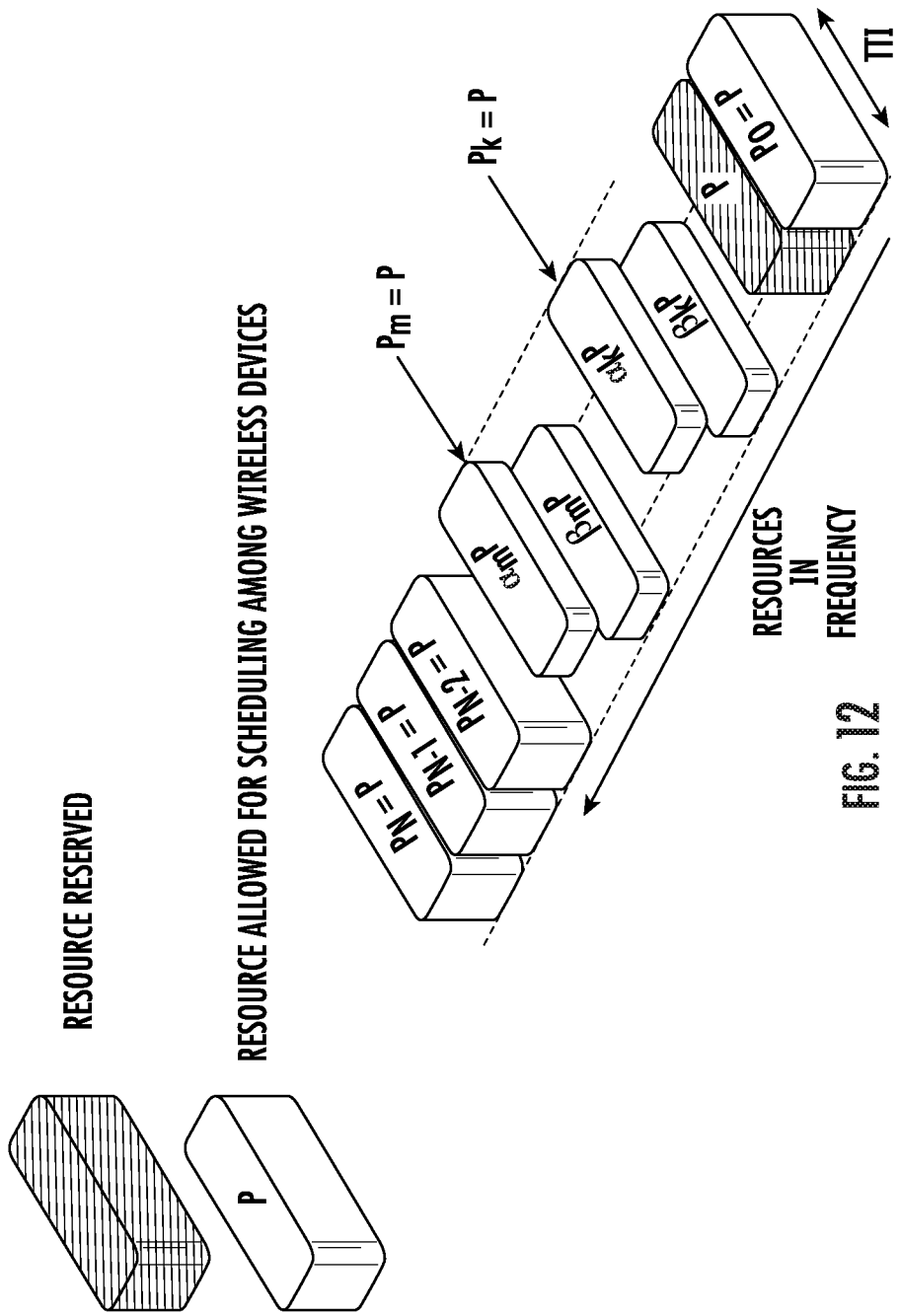
FIG. 12 illustrates an example of the concept of virtual radio frequency-resource.

For example, as depicted in FIG. 12, where there are N+1 resources available arranged in the frequency domain and the transmit power is equally distributed among the available resources, T can be expressed as follows.

$$T = NP$$

On the kth resource, two WDs 22 may be co-scheduled with powers $\alpha_k P$ and $\beta_k P$, $\alpha_k + \beta_k = 1$. If a WD 22 is scheduled on resources m and k, with transmit power of $\alpha_m P$ and $\alpha_k P$, then the resource slice for the WD 22 may be computed as follows.

$$\theta_i = \frac{(\alpha_m + \alpha_k)P}{NP}$$

Figure 13:
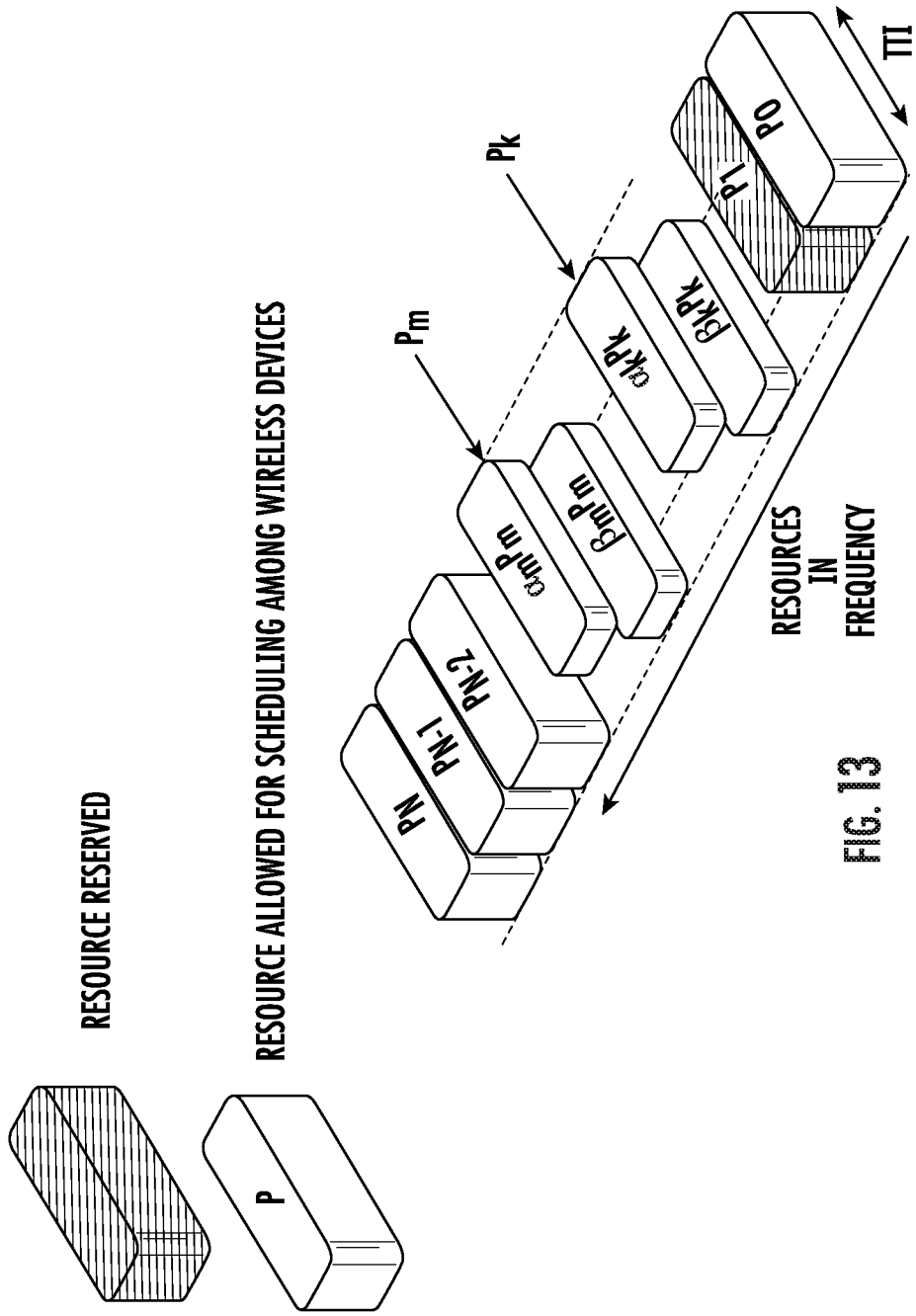
FIG. 13 illustrates an example of virtual radio frequency-resource with reserved resources.

The power allocated to the user may be the total transmit power across all the transmit layers. For example, as depicted in FIG. 13, when there are N+1 resources available and arranged in the frequency domain and the transmit power is appropriately distributed among the available resources, T can be expressed as follows.

$$T = P_0 + \sum_{j=2}^{N} P_j$$

Here the power allocated to resource-1 is not considered in computing T, since resource-1 is reserved other services, such as non-WD 22 specific signaling. On the kth resource, two WDs 22 are co-scheduled with powers $\alpha_k P$ and $\beta_k P$, $\alpha_k+\beta_k=1$. If a WD 22 is scheduled on resources m and k, with transmit power of $\alpha_m P$ and $\alpha_k P$, then the resource slice for the WD 22 is computed as follows.

$$\theta_i = \frac{(\alpha_m P_m + \alpha_k P_k)}{T}$$

Figure 14:
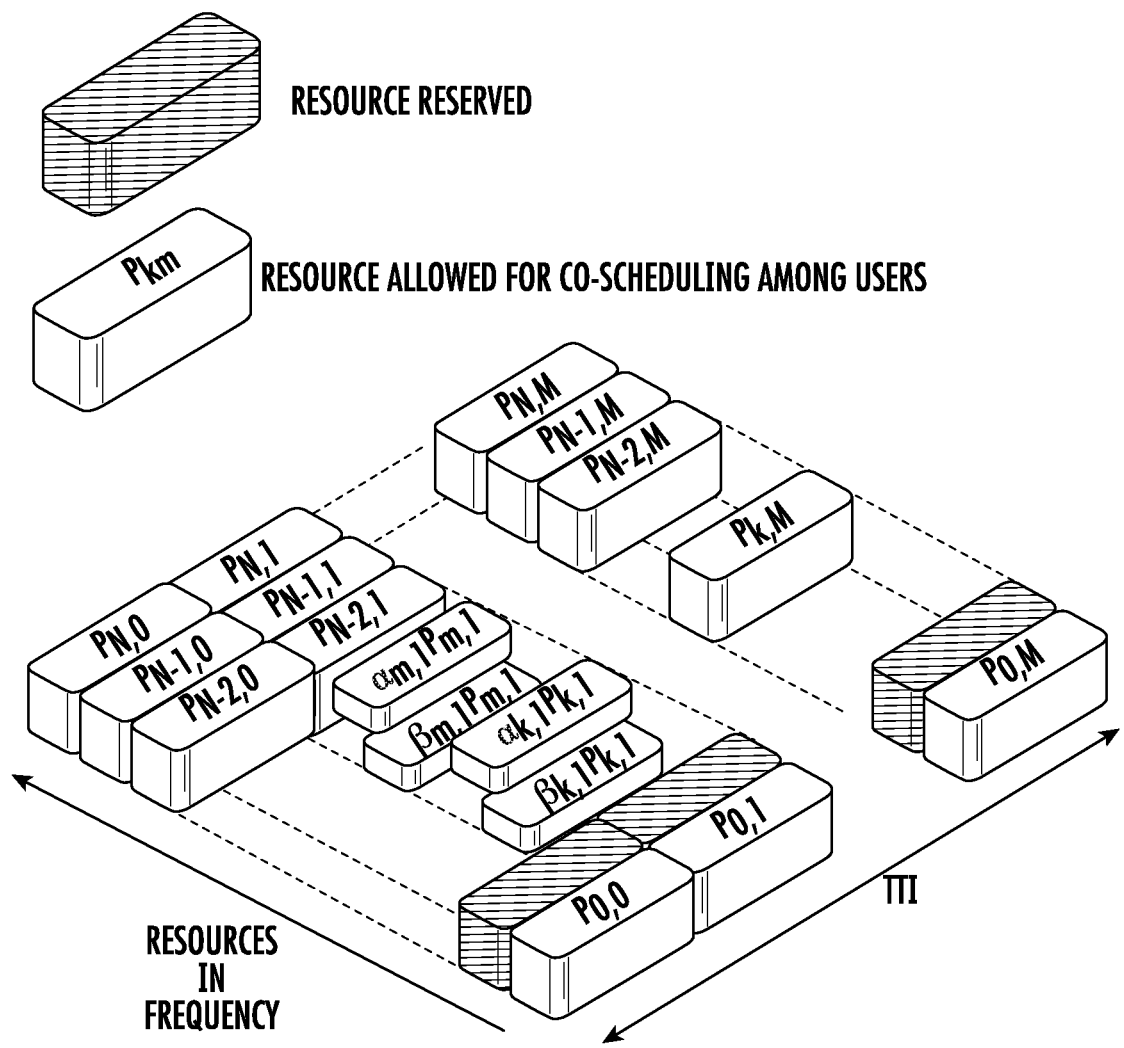
FIG. 14 illustrates an example of virtual radio time-frequency-resource with reserved resources.

In another example, as depicted in FIG. 14, when there are (N+1)(M+1) resources available and arranged in both the time and frequency domain and the transmit power is appropriately distributed among the available resources, T can be expressed as follows.

$$T = \sum_{n=0}^{M} \left\{ P_{0n} + \sum_{j=2}^{N} P_{jn} \right\}$$

where $p_{jn}$ represents the transmit power on resource corresponding to jth time bin and nth frequency bin. On all the time resources corresponding to kth frequency bin, two WDs 22 are co-scheduled with powers $\alpha_k P$ and $\beta_k P$, $\alpha_k+\beta_k=1$. If a WD 22 is co-scheduled on all time resources of m and k frequency bins, with transmit power of $\alpha_m P$ and $\alpha_k P$, then the resource slice for the WD 22 may be computed as follows.

$$\theta_i = \frac{(\alpha_{m,1} P_{m,1} + \alpha_{k,1} P_{k,1})}{T}$$

In an alternative embodiment, the virtual resource share may be computed in the following manner:

$$vru[j] = \sum_{i=0}^{nrofPRB-1} nlayers[i, j]$$

where vru[j] is the virtual resource usage of slice j and nlayers[i,j] is the number of layers used for slice j in PRB i. The total amount of virtual resources may be determined as:

$$vrtotal = \sum_{j=0}^{nrofSlices-1} \sum_{i=0}^{nrofPRB-1} \min(1, nlayers[i, j])$$

where vrtotal is the total amount of virtual resources. The virtual resource share, is then computed as $$vrs[j]=vru[j]/vrtotal$$

where vrs[j] is the used virtual resource share for slice j.

Figure 15:
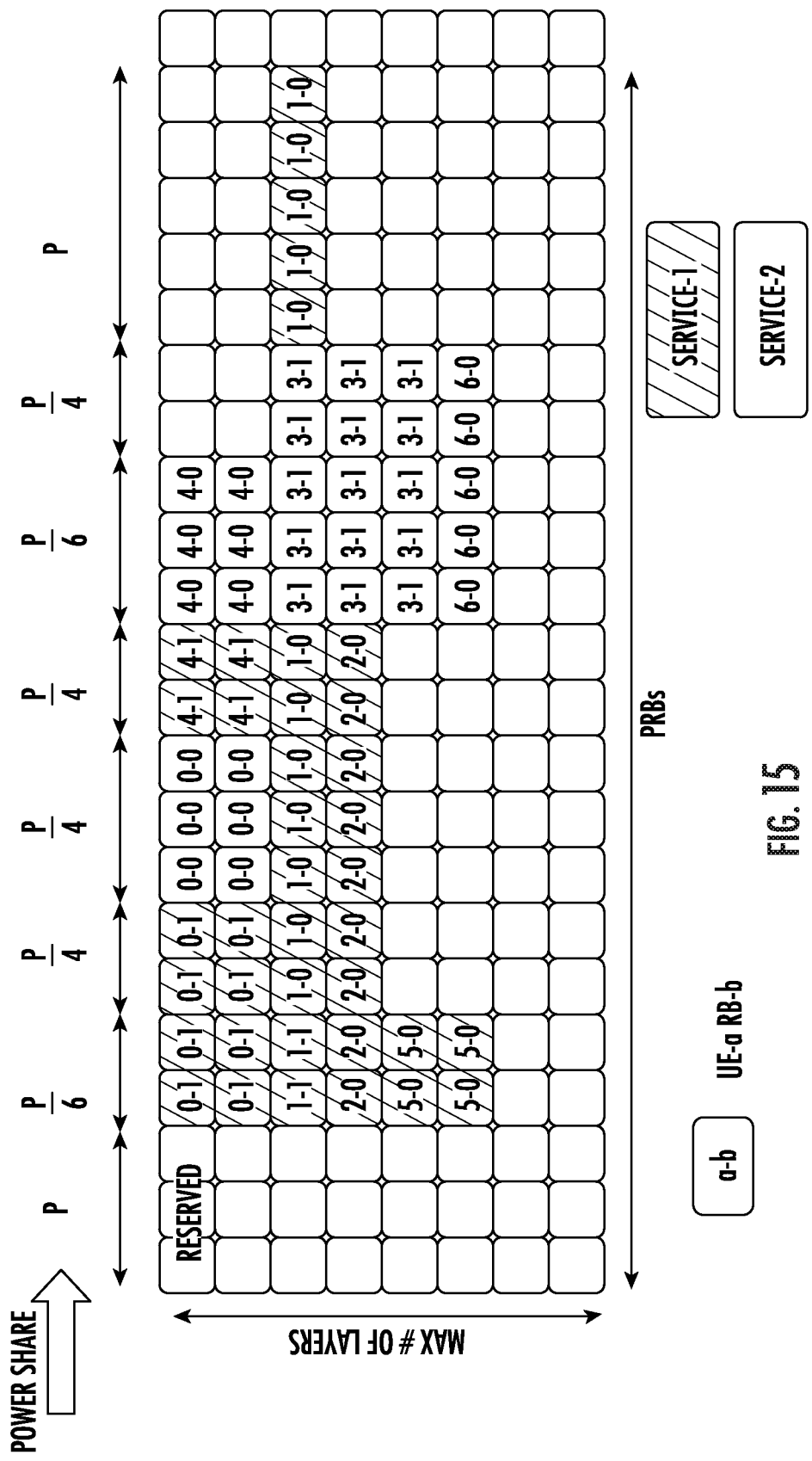
FIG. 15 illustrates an example process of user co-scheduling in a TTI.

FIG. 15 is an example of resource slicing (i.e., logically slicing a plurality of physical resources) between two services when more than one user is co-scheduled on a resource, i.e., multi-user MIMO (MU-MIMO). Some WDs 22 are assumed to have two radio bearers and each could belong to the same or different service types. In this example, the OFDM system has 23 PRBs in one TTI, while 3 PRBs are reserved for system information broadcast. The remaining 20 PRBs are allocated to the WDs 22 based on their radio bearer priority. Radio bearers are co-scheduled on the same resource if the transmissions towards the associated WDs 22 can be separable. For example, the respective transmissions may be beamformed, via the radio interface 62, in spatially different directions with no or insignificant inter-beam interference. In this example, total power is assumed to equally divided across the PRBs, i.e., P=T/23. Furthermore, the power for each PRB is equally divided across the layers. Then the virtual resource count for service-1 is counted as follows.

Virtual resource count for service-1:

$$a) \text{ Radio Bearer } 0\text{-}1 = 2PRBs * 2 \text{ Layers} * \frac{P}{6} + 2PRBs * 2 \text{ Layers} * \frac{P}{4} = \frac{5}{3}P$$

$$b) \text{ Radio Bearers } 1\text{-}0 \text{ and } 1\text{-}1 = \left(7 * \frac{P}{4} + 5P\right) + \left(2\frac{P}{6}\right) = \frac{85P}{12}$$

$$c) \text{ Radio Bearer } 2\text{-}0 = 2 * \frac{P}{6} + 7 * \frac{P}{4} = \frac{25P}{12}$$

$$d) \text{ Radio Bearer } 5\text{-}0 = 2 * \frac{P}{3} = \frac{2P}{3}$$

$$e) \text{ Radio Bearer } 4\text{-}1 = 2 * \frac{P}{2} = P$$

The virtual resource count for both services are counted as below.

Total virtual resource for service-1 ==

$$\frac{5P}{3} + \frac{75P}{12} + \frac{25P}{12} + \frac{2P}{3} + P = 150P/12$$

Total virtual resource for service-1(0-0, 3-1, 4-0 & 6-0) =

$$\left(\frac{3P}{2}\right) + \left(\frac{3P}{2} + \frac{6P}{4}\right) + \left(\frac{3P}{3}\right) + \left(\frac{3P}{6} + \frac{2P}{4}\right) = 78P/12$$

Uplink

In some embodiments, the weight corresponding to an allocated UL radio resource (or a virtual resource) is computed via the processing circuitry 68 as a fraction of uplink (UL) received power in a TTI used to receive the information on the radio resource, i.e., $w_i=P_k(i)/T$, where $P_k(i)$ is the received power for decoding information from WD-i on physical radio resource k. T is the total received power on all the resources allowed for scheduled wireless devices 22 in a given TTI. The available transmit power T may be distributed across all the time-frequency resources in the TTI.

As explained in a technical standard developed by the Third Generation Partnership Project (3GPP), namely, 3GPP Technical Standard (TS) 38.214 and 3GPP TS 36.213, a target received power per PRB is set by processing circuitry 68 of the network node 16. WDs 22 which are actively communicating with the network node 16, will have to adjust their transmit power such that the received power at the network node 16 is close to the desired receive power level. When two WDs 22 are allocated on the same radio resource for UL transmission, the network node 16 may adjust the desired receive power accordingly. The network node 16 can measure, via the radio interface 62 and/or processing circuitry 68, the received power from each WD 22 independently by using the respective received reference symbols. In general, DL scenarios like the ones depicted in FIGS. 12-15 are possible for UL also.

Generalization

In the previous sub-sections, the concept of a virtual resource is described with the assumption that the resources are scheduled at one network node 16. In general, the concept is still applicable even resources are coordinated across multiple transmit-receive points (TRPs) or network nodes 16. In multi-TRP coordinated-scheduling, resources are pooled across multiple TRPs for co-scheduling users across the network. For example, referring to FIG. 15, different layers can be transmitted from different network nodes 16.

Though the methods are presented for shared data channels, such as the physical down link shared channel (PDSCH) and physical uplink shared channel (PUSCH), these methods are applicable to control channels also.

According to some embodiments a method includes performing the following steps at every TTI:
- co-scheduling radio bearers on a set of available physical resource blocks;
- computing the virtual resource blocks that are allocated to each service type;
- computing a resource utilization margin for each service type Some embodiments include a method of resource allocation at a network node 16, the method including the following steps;
- co-scheduling radio bearers on a set of available physical resource block;
- computing the virtual resource blocks that are allocated to each service type;
- computing a resource utilization margin for each service type; and
- adjusting service priorities of each of the services for next TTI based on the computed margin.

According to one aspect, a network node 16 configured to communicate with a wireless device (WD) 22 is provided. The network node 16 includes a radio interface 62 and/or processing circuitry 68 configured to, at every transmission time interval, TTI: co-schedule radio bearers on a set of available resource blocks; determine virtual resource blocks, VRBs, allocated to each of at least one service type; determine a resource utilization margin for each of the at least one service type; and adjust service priorities of each of the services for a next TTI based at least in part on the determined resource utilization margin.

According to this aspect, in some embodiments, at least a subset of available resource blocks are allotted to the WD 22 and the processing circuitry 68 is further configured to determine a resource slice based at least in part on weights. In some embodiments, the weights are determined, via the processing circuitry 68, as a fraction of a total available power in the TTI. In some embodiments, the weights are determined as $w_i = P_k(i)/T$, where $P_k(i)$ is the transmit power for transmitting information to the WD 22 on physical resource k. In some embodiments, the processing circuitry 68 is further configured to determine a resource slice for a service type.

According to another aspect, a method implemented in a network node 16 is provided. The method includes the following steps which may be performed by the processing circuitry 68, and in particular, the processor 70: co-scheduling radio bearers on a set of available resource blocks; determining virtual resource blocks, VRBs, allocated to each of at least one service type; determining a resource utilization margin for each of the at least one service type; and adjusting service priorities of each of the services for a next TTI based at least in part on the determined resource utilization margin.

According to this aspect, in some embodiments, the method further includes allotting at least a subset of available resource blocks to the WD 22 and determining, via the processing circuitry 68, a resource slice based at least in part on weights. In some embodiments, the weights are determined as a fraction of a total available power in the TTI. In some embodiments, the weights are computed as $w_i = P_k(i)/T$, where $P_k(i)$ is the transmit power for transmitting information to the WD 22 on physical resource k. In some embodiments, the method further includes determining a resource slice for a service type.

Some Examples

Example A1. A network node 16 configured to communicate with a wireless device 22 (WD 22), the network node 16 configured to, and/or comprising a radio interface 62 and/or comprising processing circuitry 68 configured to, at every transmission time interval, TTI:
- co-schedule radio bearers on a set of available resource blocks;
- determine virtual resource blocks, VRBs, allocated to each of at least one service type;
- determine a resource utilization margin for each of the at least one service type; and
- adjust service priorities of each of the services for a next TTI based at least in part on the determined resource utilization margin.

Example A2. The network node 16 of Example A1, wherein at least a subset of available resource blocks is allotted to the WD 22, and the processing circuitry 68 is further configured to determine a resource slice based at least in part on weights.

Example A3. The network node 16 of Example A2, wherein the weights are determined as a fraction of a total available power in the TTI.

Example A4. The network node 16 of Example A3, wherein the weights are computed as $w_i = P_k(i)/T$, where $P_k(i)$ is the transmit power for transmitting information to the WD 22 on physical resource k.

Example A5. The network node 16 of any of Examples A1-A4, wherein the processing circuitry 68 is further configured to determine a resource slice for a service type.

Example B1. A method implemented in a network node 16, the method comprising:
- co-scheduling radio bearers on a set of available resource blocks;
- determining virtual resource blocks, VRBs, allocated to each of at least one service type;

determining a resource utilization margin for each of the at least one service type; and adjusting service priorities of each of the services for a next TTI based at least in part on the determined resource utilization margin.

Example B2. The method of Example B1, further comprising:

allotting at least a subset of available resource blocks to the WD 22; and determining a resource slice based at least in part on weights.

Example B3. The method of Example B2, wherein the weights are determined as a fraction of a total available power in the TTI.

Example B4. The method of Example B3, wherein the weights are computed as $w_i = P_k(i)/T$, where $P_k(i)$ is the transmit power for transmitting information to the WD 22 on physical resource k.

Example B5. The method of any of Examples B1-B4, further comprising determining a resource slice for a service type.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| AAS | Adaptive or Advanced Antenna Systems |
| DL | Downlink |
| MU-MIMO | Multi-User Multi-Input Multi-Output |
| PRB | Physical Radio Block |
| TTI | Transmission Time Interval |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
    processing circuitry configured to:
        determine virtual resources at least in part by logically slicing a plurality of physical resources across a spatial domain;
        assign the virtual resources to a first radio bearer associated with a first wireless device;
        co-schedule a plurality of radio bearers including the first radio bearer on at least one logical slice of the plurality of physical resources;
        compute a number of virtual resources that are assigned to each service type of the plurality of radio bearers;
        compute a resource margin for each service type of the plurality of radio bearers; and
        adjust a service priority for at least one of the plurality of radio bearers for a next transmission time interval, TTI, based on the resource margin.

2. The network node of claim 1, wherein the logical slicing of the plurality of physical resources across the spatial domain is performed by service type.

3. The network node of claim 1, wherein at least one of the plurality of physical resources is reused among a plurality of radio bearers including the first radio bearer.

4. The network node of claim 1, wherein the determined virtual resources correspond to a logical slice of the plurality of physical resources.

5. The network node of claim 1, wherein the service priority corresponds to service-type priority level that is based on a virtual resource share in a previous TTI.

6. The network node of claim 1, wherein co-scheduling the plurality of radio bearers includes:
    prioritizing the plurality of radio bearers per service type in a plurality of service queues;
    prioritizing the plurality of radio bearers for allocation in a TTI based at least on each service type associated with each of the plurality of radio bearers; and
    the assigning of the virtual resources to the first radio bearer being based at least on the prioritizing of the plurality of radio bearers for allocation.

7. The network node of claim 1, wherein co-scheduling the plurality of radio bearers includes:
    prioritizing the plurality of radio bearers in a plurality of service queues based on service type and at least one priority within a respective service type;
    prioritizing the plurality of radio bearers for allocation in a TTI based at least on each service type and the at least one priority within the respective service type; and
    the assigning of the virtual resources to the first radio bearer being based at least on the prioritizing of the plurality of radio bearers for allocation.

8. The network node of claim 1, wherein the plurality of physical resources corresponds to N physical resources that are spatially multiplexed to correspond to a pool of M*N virtual resources, where M corresponds to a number of wireless device, each wireless device including the first wireless device being assigned N virtual resources.

9. The network node of claim 1, wherein the processing circuitry is further configured to assign a plurality of wireless devices including the first device respective virtual resources for Multi User-Multiple Input Multiple Output, MU-MIMO, communication.

10. The network node of claim 1, wherein the virtual resources assigned to the first radio bearer correspond to a sum of weights of the plurality of physical resources, each weight corresponding to a transmit power for transmitting information to the wireless device on at least one physical resource divided by a total available transmit power for physical resources allowed scheduling to wireless devices in a TTI.

11. A method performed by a network node, comprising:
    determining virtual resources at least in part by logically slicing a plurality of physical resources across a spatial domain;
    assigning the virtual resources to a first radio bearer associated with a first wireless device;
    co-scheduling a plurality of radio bearers including the first radio bearer on at least one logical slice of the plurality of physical resources;
    computing a number of virtual resources that are assigned to each service type of the plurality of radio bearers;
    computing a resource margin for each service type of the plurality of radio bearers; and
    adjusting a service priority for at least one of the plurality of radio bearers for a next transmission time interval, TTI, based on the resource margin.

12. The method of claim 11, wherein the logical slicing of the plurality of physical resources across the spatial domain is performed by service type.

13. The method of claim 11, wherein at least one of the plurality of physical resources is reused among a plurality of radio bearers including the first radio bearer.

14. The method of claims 11, wherein the determined virtual resources correspond to a logical slice of the plurality of physical resources.

15. The method of claim 11, wherein the service priority corresponds to service-type priority level that is based on a virtual resource share in a previous TTI.

16. The method of claim 11, wherein co-scheduling the plurality of radio bearers includes:
    prioritizing the plurality of radio bearers per service type in a plurality of service queues;
    prioritizing the plurality of radio bearers for allocation in a TTI based at least on each service type associated with each of the plurality of radio bearers; and
    the assigning of the virtual resources to the first radio bearer being based at least on the prioritizing of the plurality of radio bearers for allocation.

17. The method of claim 11, wherein co-scheduling the plurality of radio bearers includes:
    prioritizing the plurality of radio bearers in a plurality of service queues based on service type and at least one priority within a respective service type;
    prioritizing the plurality of radio bearers for allocation in a TTI based at least on each service type and the at least one priority within the respective service type; and
    the assigning of the virtual resources to the first radio bearer being based at least on the prioritizing of the plurality of radio bearers for allocation.

18. The method of claims 11, wherein the plurality of physical resources corresponds to N physical resources that are spatially multiplexed to correspond to a pool of M*N virtual resources, where M corresponds to a number of wireless devices, each wireless device including the first wireless device being assigned N virtual resources.

19. The method of claim 11, further comprising assigning a plurality of wireless device including the first device respective virtual resources for Multi User- Multiple Input Multiple Output, MU-MIMO, communication.

20. The method of claims 11, wherein the virtual resources assigned to the first radio bearer correspond to a sum of weights of the plurality of physical resources, each weight corresponding to a transmit power for transmitting information to the wireless device on at least one physical resource divided by a total available transmit power for physical resources allowed scheduling to wireless devices in a TTI.

21. A method performed by a network node, comprising:
    determining virtual resources at least in part by logically slicing a plurality of physical resources across a spatial domain;
    assigning the virtual resources to a first radio bearer associated with a first wireless device,
    wherein the virtual resources assigned to the first radio bearer correspond to a sum of weights of the plurality of physical resources, each weight corresponding to a transmit power for transmitting information to the wireless device on at least one physical resource divided by a total available transmit power for physical resources allowed scheduling to wireless devices in a Transmission Time Interval (TTI); and
    assigning a plurality of wireless device including the first device respective virtual resources for Multi User-Multiple Input Multiple Output, MU-MIMO, communication.

\* \* \* \* \*